United States Patent [19]

Suzuki et al.

[11] Patent Number: 5,774,362

[45] Date of Patent: Jun. 30, 1998

[54] INPUT DEVICE FOR NAVIGATION SYSTEMS

[75] Inventors: Seiichi Suzuki; Hiroki Ishikawa, both of Tokyo-to, Japan

[73] Assignee: Kabushikikaisha Equos Research, Japan

[21] Appl. No.: 609,977

[22] Filed: Feb. 29, 1996

[30]     Foreign Application Priority Data

Mar. 7, 1995   [JP]   Japan ................................. 7-074388

[51] Int. Cl.⁶ .................................................. G01C 21/20
[52] U.S. Cl. ..................................... 364/443; 364/709.01
[58] Field of Search ............................... 364/443, 444.1, 364/449.2, 709.01; 340/995

[56]                References Cited

U.S. PATENT DOCUMENTS

| | | | |
|---|---|---|---|
| 5,113,178 | 5/1992 | Yasuda et al. ........................ | 340/709 |
| 5,406,491 | 4/1995 | Lima ..................................... | 364/449 |
| 5,596,500 | 1/1997 | Sprague et al. ..................... | 364/449.7 |

FOREIGN PATENT DOCUMENTS 234890   2/1990   Japan .

*Primary Examiner*—Michael Zanelli
*Attorney, Agent, or Firm*—Lorusso & Loud

[57]                ABSTRACT

An input unit for navigation systems which easily inputs positional information for a destination point and so on. When discrimination information for a designated section of a map is input by an input device and representative points of the section and a certain point within the section are designated by using a transparent tablet overlaid on the map, a CPU, by reference to a map data base, calculates the geographic coordinates of the designated point within the designated section, based on the geographic coordinates of the representative point(s) of the section, and based on all positional information which is output from the transparent tablet and which corresponds to the representative point(s) of the section and the designated point within the section, and transmits the geographic coordinates of the designated point to a navigation device ECU.

16 Claims, 5 Drawing Sheets

INPUT DEVICE FOR NAVIGATION SYSTEMS

BACKGROUND OF THE INVENTION

1. Field of the Invention

The present invention relates to an input device for navigation systems, and more particularly, to an input device for navigation systems which inputs positional information relating to a destination point, a starting point, etc.

2. Desription of Related Art

Navigation systems which determine routes to desired points of destination and guide drivers to those points of destination have been widely used. When a point of destination and starting point are input, these navigation systems conduct a search to determine a travel route between these two points and provide route guidance along the determined travel route, including indication of present position, an arrow showing the direction of travel and the like on a display screen. These navigation devices search for a travel route and display a mark indicating the point of destination and other map information by recognition of geographic positions identified by geographic coordinates of latitude and longitude.

The inputting of a point of destination from a map in a commercially available map book, magazine, or guidebook, either by direct input into the navigation system after reading the address of the point of destination from a map book, or by input with a pen through the navigation device display, conventionally involves identification of the section of the map book from which the point of destination is taken. Identification of the map book section may be by reading a bar code provided in each section, by visual recognition of a picture image of a section using an image scanner, by input of a section number using a keypad, or by input of geographic coordinates (longitude and latitude) of a point representative of a section, for example, a point in the upper left corner of the map or map page.

However, the reading of information for a point of destination on a map is considered extremely complicated. The input of information identifying a destination with reference to a section of a map book is also complicated since it requires two operative steps, i.e. input of identification of a section in the map book and input of the point of destination on a display.

Japanese Patent Application Laid-open No. Hei 2-34890 describes a method of inputting a point of destination and so on by using a transparent tablet sheet. However, this method requires that the transparent tablet sheet be placed over a map book and that the starting point, geographic position of the destination, and travel route be traced on the transparent tablet sheet along the map which is under the transparent tablet sheet, so that the user must input the travel route which should basically be determined by the navigation system and the operation is therefore complicated. This method only inputs a relative positional relationship between each geographic point and can not input geographic coordinates of a point of destination and, accordingly, a geographic point can not be accurately specified.

SUMMARY OF THE INVENTION

Accordingly, an object of the present invention is to provide an input device for navigation systems in which positional information, e.g. geographic coordinates, for a point of destination and other points can be easily inputted.

The input unit of the present invention includes a map data memory for storing discrimination information for every section of a map reference source (e.g. map book) and corresponding geographic coordinates of at least one representative point for each of the respective sections, discrimination information input means for inputting the discrimination information identifying the section, geographic coordinate acquisition means for obtaining, from the above-described map data memory, geographic coordinates of at least one representative point for the section identified by the discrimination information and a transparent tablet of an electronic digital plotter, slid over the map, for outputting positional information of a point designated on the transparent tablet. Geographic coordinate calculating means determines the geographic coordinates of the designated point based upon the geographic coordinates of the representative point for the section, the positional relationship between the representative point and the transparent tablet, and positional information for the designated point, e.g. a destination identified on the transparent tablet. Output means outputs the geographic coordinates determined by the geographic coordinate calculating means to the navigation system.

The geographic coordinate acquisition means may obtain the geographic coordinates of the representative point by manual input, e.g. through a keypad. The geographic coordinate calculating means may obtain the positional relationship between the representative point and the transparent tablet based upon positional information for the designated point corresponding to the representative point or by putting the transparent tablet on top of the map in a certain position relative to the map section. The above-described transparent tablet may have an accessory line shaped to be aligned with border lines between the selected and contiguous sections on the map. The output means may provide a map display, and the above-described discrimination information input means may be integrated with or separate from the above-described map display means for inputting discrimination information such as the kind of map, the page number of the map, and the name of the section. The discrimination information input means may include a key-board having characters such as ten number keys and letter keys for inputting discrimination information. The discrimination information input means may also include a cursor-control key for inputting the discrimination information by moving a cursor on the map display and/or a bar code reader for inputting the discrimination information by reading a bar code from the map used with the input device. Further, the discrimination information input means may include a picture recognition device for inputting the discrimination information by visual recognition of the map in the input device.

The geographic coordinate calculating means may include a designated point input device which is integrated with or separate from the above-described transparent tablet in the input device.

The above-described map data memory means may store, as the representative point, a pair of geographic coordinates, both of them being points of intersection of border lines between a selected section and the contiguous surrounding sections, one geographic coordinate being located at one end of a diagonal line in one section, and the other being located at the other end of the diagonal line. Alternatively, the map data memory means may store, as the representative point, at least one intersection point of the border lines between a selected section and the contiguous sections and the scale of the section indicated in the input device. The map data memory means may store at least one representative point from a page of the map book and the scale of that page. The map data memory means may be a CD-ROM which is integrated with the above-described map display or which is a built-in, in a handy terminal separate from the map display means. Alternatively, the above-described map data memory means may be an IC-card which is integrated with the map display means or which is built-in in a handy terminal separate from the map display means.

Instead of the geographic coordinate calculating means, the input unit of the present invention may be provided with absolute coordinate calculating means for calculating the absolute coordinates of the designated point based upon the absolute coordinates of at least one representative point of the section, the positional relationship between that one representative point and the above-described transparent tablet, and positional information for the designated point obtained by input through the above-described transparent tablet. In this case, the absolute geographic coordinates determined by the absolute coordinate calculating means are output by the output means.

DETAILED DESCRIPTION OF THE PREFERRED EMBODIMENT(S)

Figure 1:
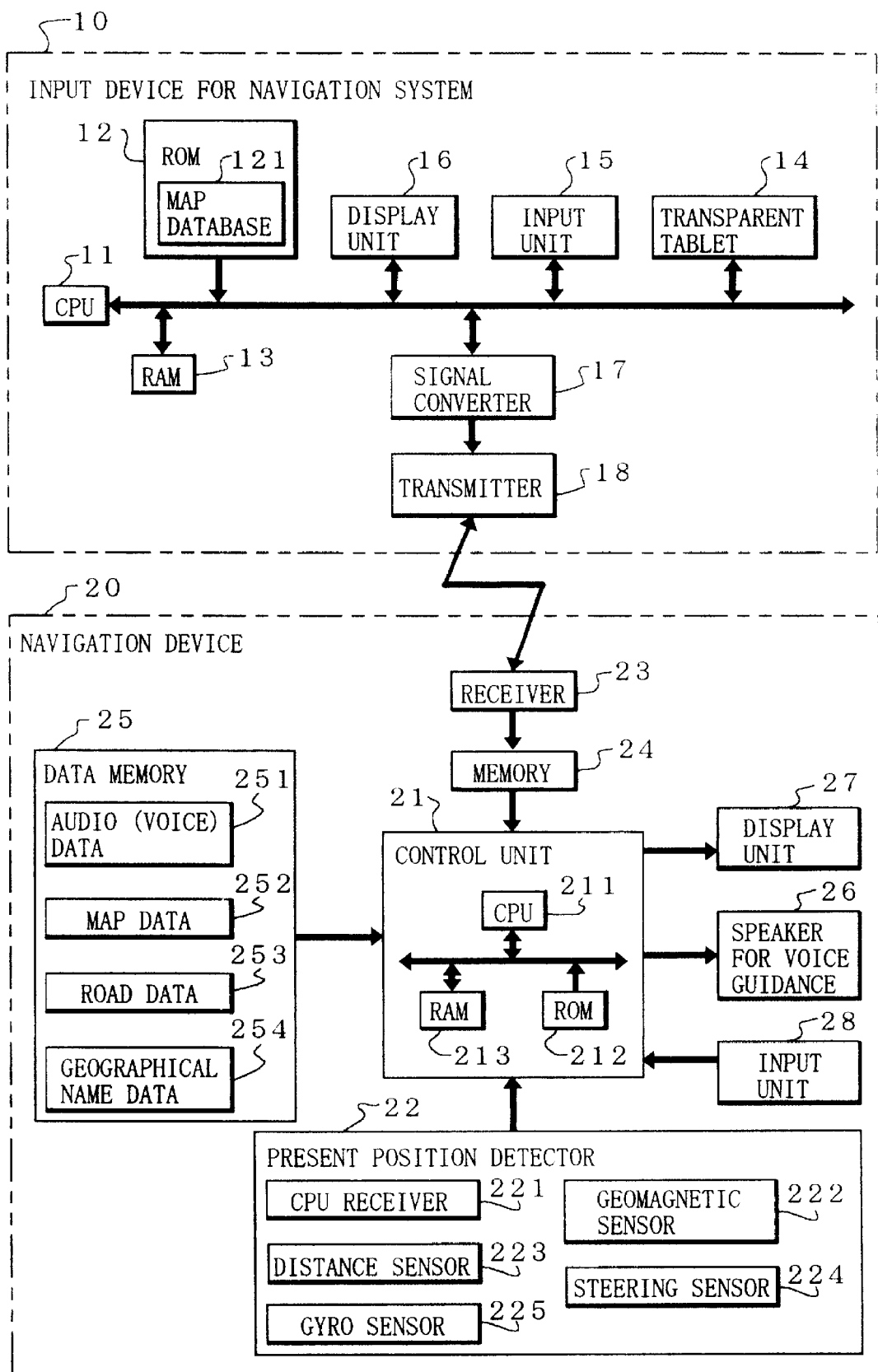
FIG. 1 is a block diagram of an input unit for navigation systems in one embodiment of the present invention and of a navigation device which receives input from the input unit.

Certain terminology will be used in the following description for convenience in reference only and is not intended to be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

A preferred embodiment of an input device for navigation systems, in accordance with the present invention, will now be described with reference to FIG. 1 which shows an input device 10 for navigation system 20 as being provided with a CPU (Central Processing Unit) 11 which effects various controls. CPU 11 is connected by a bus line such as a data bus, to ROM 12, RAM 13, a transparent tablet 14, an input device 15, a display 16, and a signal converter 17. A transmitter 18 is connected to the signal converter 17.

ROM 12 is Read Only Memory and is stored with various kinds of programs and data for calculating geographic coordinates (latitude and longitude) of a destination point and for controlling the transmission of the calculated geographic coordinates of the destination point. By executing these stored programs CPU 11 controls each unit and operation. ROM 12 also stores a map data base 121 which includes correlated information, i.e. interrelated discrimination information for every map section, geographic coordinates of a representative point for each section and the scale for every section of a map book.

RAM 13 is a Random Access Memory which stores various data such as input data, data calculated by CPU 11, and so on, and is used as a working database for CPU 11.

The transparent tablet 14, in the form of a transparent sheet, outputs positional information for a point designated by placement of a pen on the transparent tablet 14. The transparent tablet 14 has transparent electrodes arranged in a matrix and signals are generated by electromagnetic induction with the pen to designate the selected point. Alternatively, positional information for a point designated with a pen or finger on the transparent tablet 14 may be obtained from pressure sensitive sensors arranged in the form of a matrix.

Positional information which is output from this transparent tablet 14 is stored in a predetermined area of RAM 13.

The input unit 15 is a device for inputting discrimination information and geographic coordinates of a map section, e.g. a bar code reader, an image scanner, or a keypad. This input unit 15 is provided with a tablet input ON key, a tablet input OFF key, an initial setting enter key, a specified destination reference key, a destination transmission key, etc.

The display 16 may be a liquid crystal display or CRT, and shows discrimination information, etc. for the map section which is input by the input unit 15. Optionally, this display 16 may include a touch panel showing keys which form the input unit 15.

A signal converter 17 modulates absolute coordinate data for a chosen destination and outputs that data, through the transmitter 18, to the navigation device 20 by infrared or other type of signal transmission.

The input device for the navigation system 10 is provided with an electric power source, for supplying each of the above-described units with electric power, and a power switch, though not illustrated in the drawings.

The various components of the input device of the present invention may be integrated, the transparent tablet 14 only may be separate from the other components, or the transparent tablet 14, the input unit 15, and the display 16 may all be separate.

The navigation device 20 which provides route guidance, is provided with a controller 21 for effecting various controls, and this controller 21 receives inputs from a present geographic position detector 22, a receiver 23, memory 24, data memory 25, a speaker for voice guidance 26, a display 27, and an input unit 28. A data input unit through which various kinds of data, for example, traveling speed, are input, is connected to the controller 21, though not illustrated in the drawings.

The controller 21 is provided with CPU 211, ROM 212, and RAM 213 which are connected to one another by a bus line. The various operations of the navigation device such as route searching, present geographic position detection, and route guidance are provided by CPU 211 which executes programs stored in ROM 201, using RAM 213 as its working area.

The present geographic position detector 22 includes a GPS (Global Positioning System) receiver 221 for determining the geographic position of a vehicle by communication with an artificial satellite, a geomagnetism sensor 222 for obtaining vehicle azimuth by detecting geomagnetism, a distance sensor 223, a steering sensor 224 for detecting steering angle, and a gyro sensor 225, such as an optical fiber gyro, a gas rate gyro or an oscillation gyro, for obtaining vehicle azimuth by detecting and integrating the vehicle's angular speed. Though not illustrated in the drawings, the present geographic position detector 22 may utilize various other devices for detecting the present geographic position such as, for example, a beacon receiver which receives positional information from a beacon positioned on the road. The present geographic position detector 22 detects the present geographic position of the vehicle, traveling or stopped, based upon the output of each of these sensors.

The receiver 23 receives geographic coordinate data for the point of destination transmitted from the transmitter 17 of the input device 10, and this received data is stored in the memory 24.

The data memory 25 is stored with various data such as intersection data, audio data 251, map data 252, road data 253, and geographic name data 254, for conducting route guidance.

A speaker for voice guidance 26 is provided for outputting voice guidance, for example, "Turn to the right at the intersection 100 m ahead," and so on, and for outputting various instructions by voice for setting a point of destination, etc. and operates in conjunction with a voice output IC, an amplifier, and a loudspeaker.

The display 27 displays various pieces of information required for route guidance such as a map of the area surrounding the road on which the vehicle is presently traveling, the present geographic position of the vehicle, the travel route of the vehicle, the direction and the distance to the point of destination and so on, and may be a CRT or a liquid crystal display, for example.

The input unit 28 is an input device for inputting a point of destination and various other data.

Figure 2:
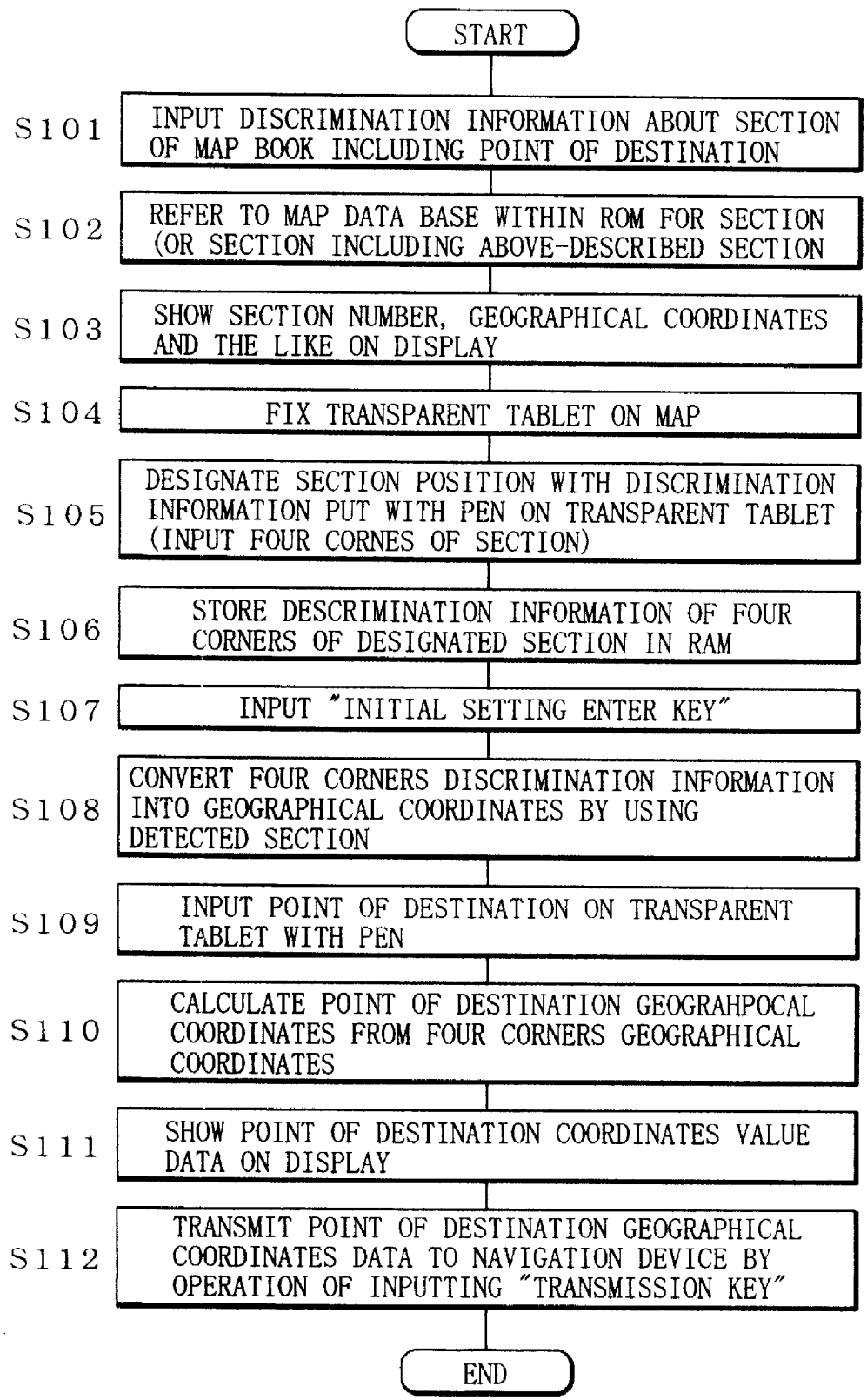
FIG. 2 is a flow chart illustrating operations for setting a destination using the input unit of the embodiment of FIG. 1.

FIG. 2 illustrates the procedure for setting a destination point. In this procedure, an operator first inputs discrimination information for a map section of a map including a destination point by using the input unit 15 (Step 101). For this purpose a bar code, showing the section number may be read with a bar code reader, the number of the section of a map book may be read with an image scanner, the section number may be input through a keypad or the geographic coordinates of a representative point designated for the selected map section may be input through a keypad.

Figures 3, 4:
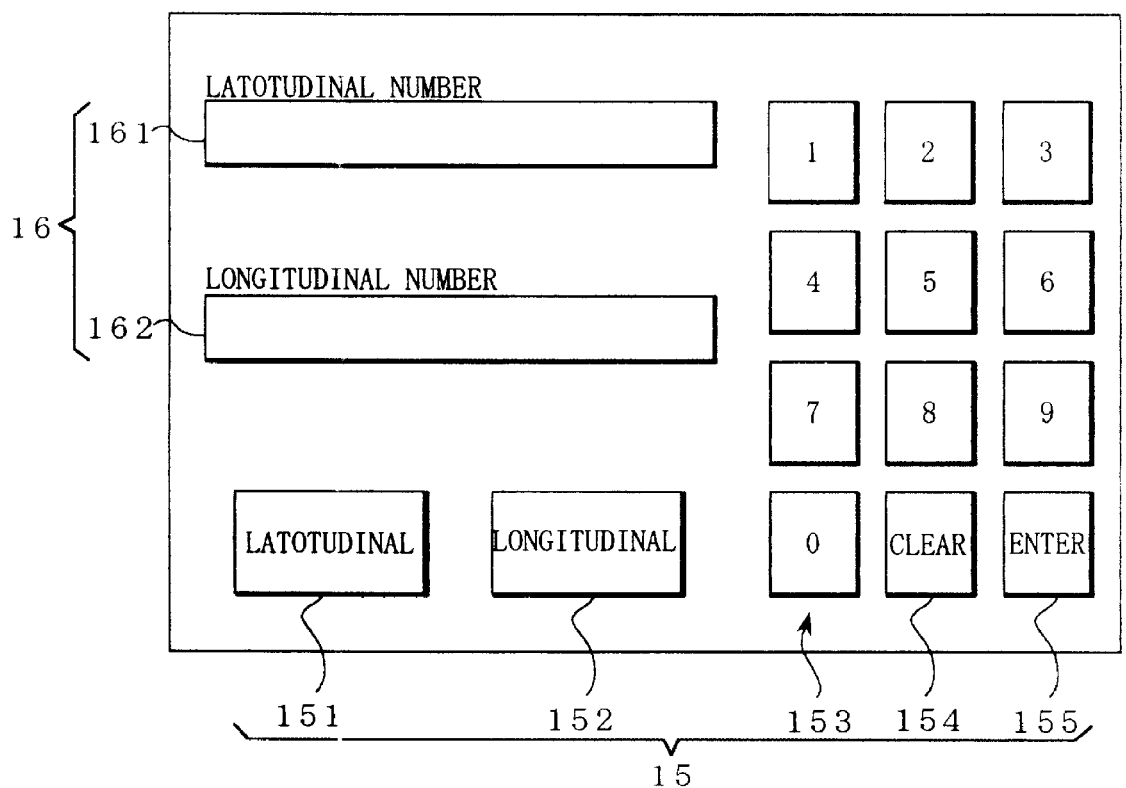
FIG. 3 is a chart illustrating one example of a section of a map book used in the embodiment of FIG. 1.
FIG. 4 shows one example of a keypad and display for the input unit of the embodiment of FIG. 1.

FIG. 3 and FIG. 4 illustrate the inputting of discrimination information including a section number by using a keypad.

FIG. 3 shows a section of a map of the whole country. The whole country is divided into 4096×4096 blocks by first dividing the map of the whole country into 8×8 blocks and by further dividing those divided blocks into 8×8 blocks three times.

In this example, one section is represented by the section numbers consisting of a longitudinal number and latitudinal number which have the same number of figures as the number of times the map is divided. This means, for example, the section represented by section numbers of "6356" latitude and "4575" longitude exists in the block of latitude "6" and longitude "4" in the level where the map of the whole country is divided into 8×8 blocks (the first division level), in the block of latitude "3" and longitude "5" in the level where the block is further divided into 8×8 blocks (the second division level), in the block of latitude "5" and longitude "7" in the level where the block is further divided into 8×8 blocks (the third division level), and in the block of latitude "6" and longitude "5" in the level where the block is further divided into 8×8 blocks (the fourth division level). Section numbers are provided in each section of a map book.

FIG. 4 illustrates one example of an arrangement of the input unit 15 and the display 16 wherein a section is represented by section numbers as described above. In this example, the input unit 15 is provided with a latitudinal number key 151 to be pressed when a latitudinal section number is input, a longitudinal number key 152 to be pressed when a longitudinal section number is input, ten number keys 153 for inputting the latitudinal number or longitudinal number, a clear key 154 for clearing input data, and an enter key 155 for designating the completion of inputting the data.

The ten number keys 153 are also used as a tablet input ON key, tablet input OFF key, an initial setting enter key, a destination reference key, a destination transmission key, and so on.

The display unit 16 is provided with a latitudinal number display 161 showing an input latitudinal number and a longitudinal number display 162 showing an input longitudinal number.

In this input unit 15 and display unit 16, when a latitudinal number is input by using the ten number keys 153, after the latitudinal number key 151 is pressed, the input latitudinal number is shown on the latitudinal number display 161. Likewise, when a longitudinal number is input by the ten number keys 153, after the longitudinal number key 152 is pressed, the input longitudinal number is shown on the longitudinal number display unit 162, and by pressing the enter key 155 the inputting of the section numbers is completed.

Returning to the explanation of FIG. 2, after the inputting of the discrimination information, identifying a section of a map book and a destination, has been completed, CPU 11 refers to the map data base 121 within ROM 12 for the identified section (or a section including the identified section) (step 102). Then, CPU 11 shows the section numbers of the detected section, the geographic coordinates, and the like on the display unit 16 (step 103).

Figure 7:
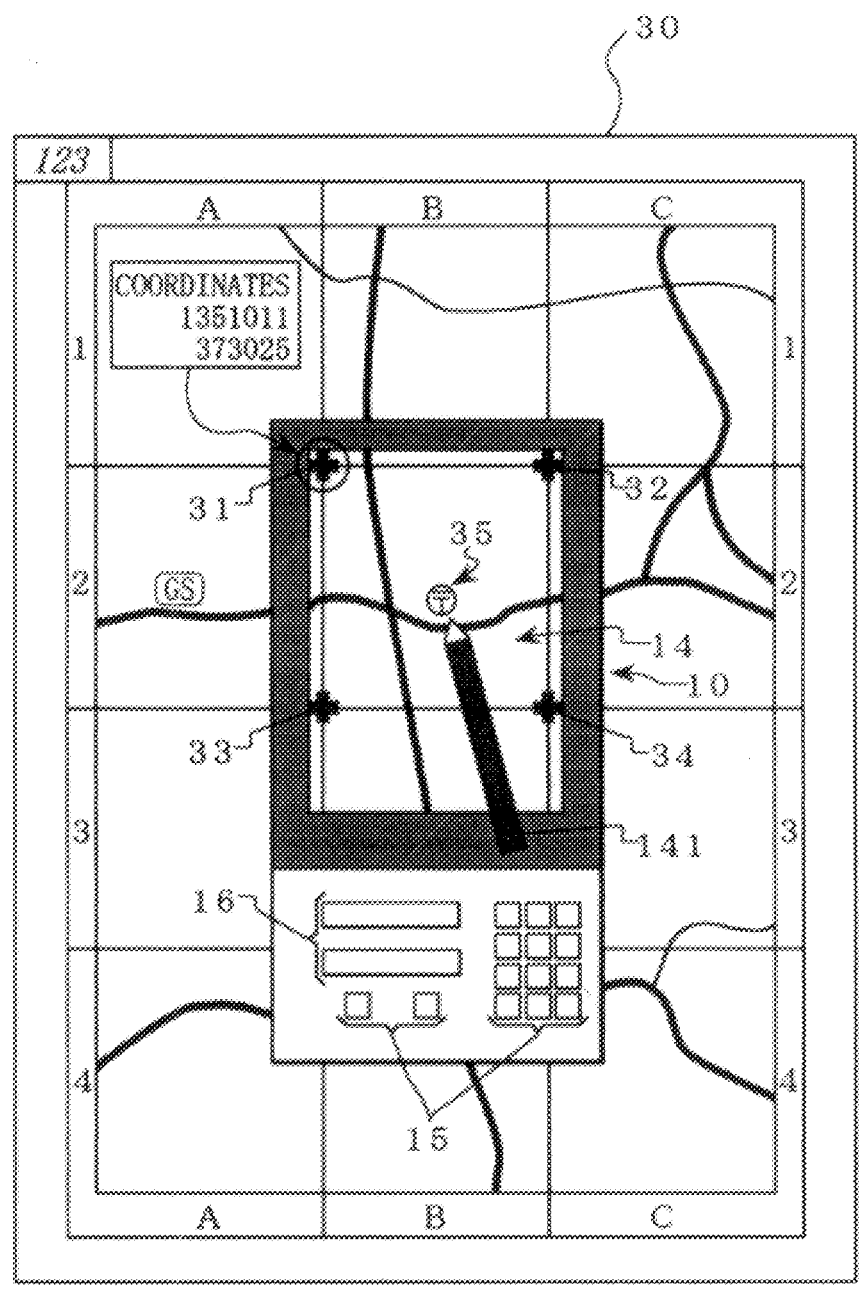
FIG. 7 illustrates an input screen for inputting a destination in using the input unit of the embodiment of FIG. 1.

Then, as FIG. 7 illustrates, an operator fixes the transparent tablet 14 over the map 30 (step 104), and designates the position of the section, for which the discrimination information has been inputted, by indicating it on the transparent tablet 14 with the pen 141 (step 105). For example, as FIG. 7 illustrates, the positions of four corners 31, 32, 33, and 34 of the section are input as designated, representative points for the section. Next, the CPU 11 stores the positional information of the four corners of the section designated on the transparent tablet 14 in RAM 13 (step 106).

Then, when the operator presses on the "initial setting enter key" on the input unit (step 107), CPU 11, converts the positional information for the four corners into geographic coordinates (east longitude and latitude) (step 108). Next, when the operator inputs the position of the destination 35 on the transparent tablet 14 with the pen 141 (step 109), the CPU 11 determines geographic coordinates of the point of destination, based upon the geographic coordinates of the four corners and the positional information for the point of destination received as input from the transparent tablet 14 (step 110).

After the geographic coordinates of the destination have been determined, the CPU 11 informs the operator of the geographic coordinates of the point of destination by display on the display unit 16, or by sound or flashing light (step 111). Then, when the operator presses the "transmission key" on the input unit 15, the CPU 11 transmits the geographic coordinate data for the point of destination to the navigation device 20 by using the signal converter 17 and the transmitter 18 (step 112), and the operation is completed.

In the navigation device 20, the absolute coordinate data for the destination transmitted from the input device for the navigation system 10 is received in the receiver 23, with its form recovered, and is stored in the memory 24.

Then CPU 211 of the control unit 21 determines a travel route from the present geographic position to the point of destination designated by the geographic coordinates stored in the memory 24, by using each datum stored in the data memory 25, and provides route guidance for following the determined travel route. Route guidance is provided by a map display of the area around the present geographic position on the display unit 27. The CPU 211 determines the travel route by a search of the map data 252 stored in the data memory 25, based upon the input from the present geographic position detector 22. The travel route, the vehicle's present geographic position, an arrow showing the travel direction, the distance, and the like are shown on the map display.

Voice guidance for following the travel route is also appropriately output from a speaker 26 by using the audio data 251 stored in the data memory 25.

Using the input system of the present embodiment, a chosen destination can be input as described below even when using a map for which data has not been stored in the map data base 121, so long as the geographic coordinates can be determined from the map.

Figure 5:
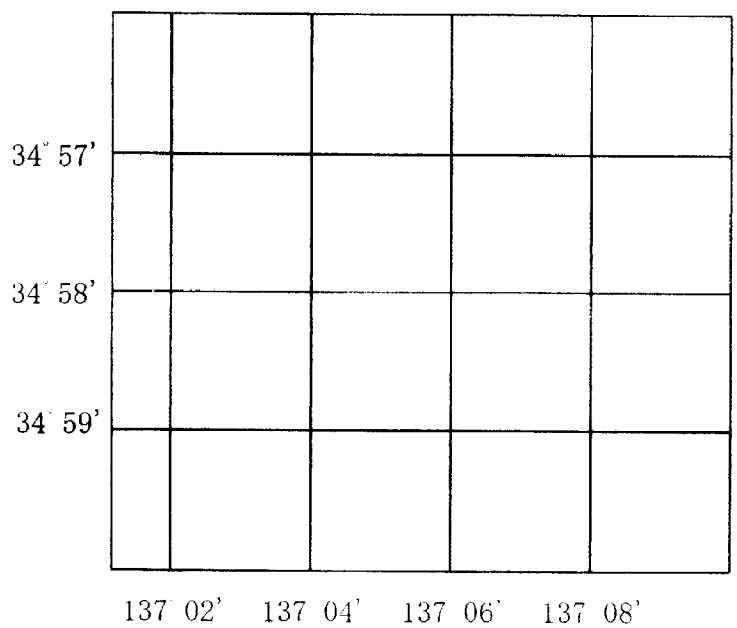
FIG. 5 is a chart illustrating another example of a section of a map book which may be used with the embodiment of FIG. 1.
Figure 6:
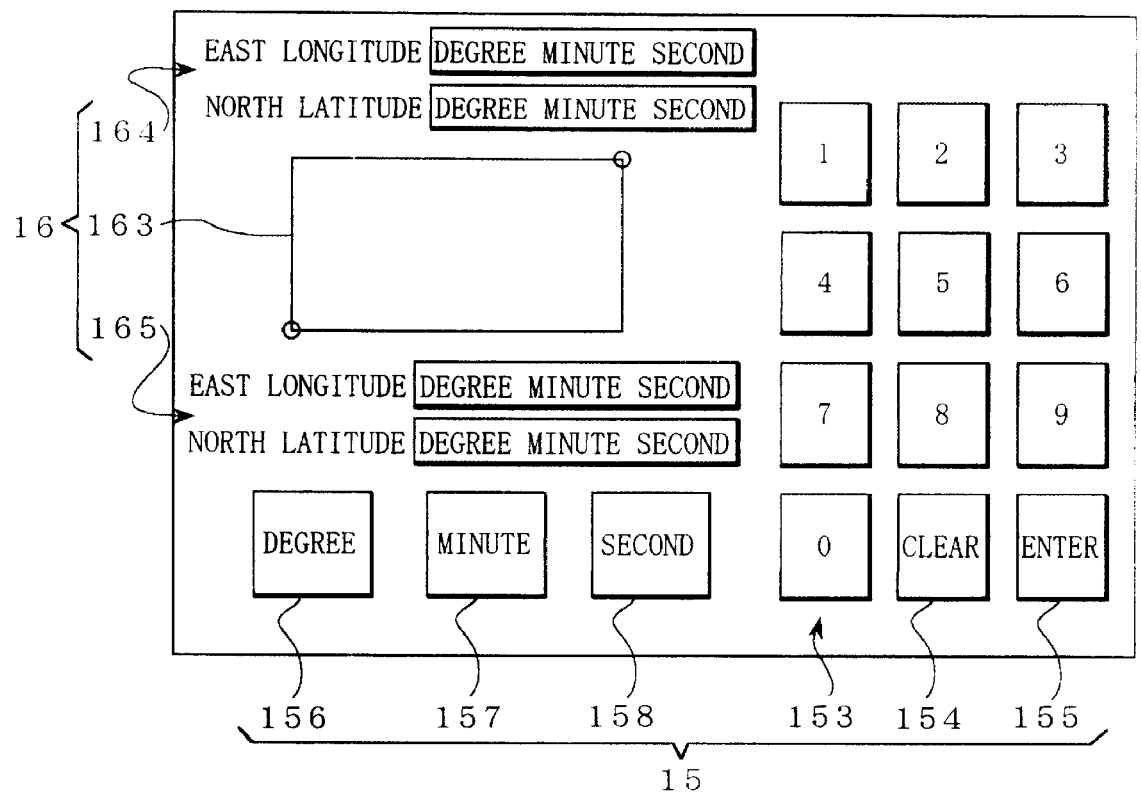
FIG. 6 shows a second example of a keyboard and display for the input unit of the embodiment of FIG. 1.

FIG. 5 illustrates one example of a map on which the geographic coordinates (east longitude, north latitude) are shown and FIG. 6 illustrates one example of input unit 15 integrated with display 16. In this example, to designate a section, a pair of absolute coordinates for the points at each end of a diagonal line in the section are input. The input unit 15 has ten number keys 153 for inputting the values of east longitude and north latitude given on a map, a clear key 154 for clearing input data, an enter key 155 for indicating completion of the inputting of data, and a degree key 156, a minute key 157, and a second key 158 which are to be pressed when the east longitude and north latitude provided on a map are input.

The ten number keys 153 are also used as the tablet input ON key, the tablet input OFF key, the initial setting enter key, a point of destination reference key, a point of destination transmission key and so on.

The display unit 16 provides longitude and latitude displays 164 and 165 showing the input geographic coordinates of the points at opposite ends of a diagonal line positioned to diagonally bisect rectangular screen 163.

In using this input unit 15 and the display 16, when inputting the east longitude and north latitude coordinates for points at each end of a diagonal line, using the ten number keys 153 after pressing the degree key 156, minute key 157, and second key 158 while looking at a map, the input values for the east longitude and north latitude are shown on the longitude and latitude displays 164 and 165 and, by pressing the enter key 155, the inputting of the absolute coordinates of the representative points of a section is completed.

Next, by inputting the positions of the representative points (in this embodiment the two points at the respective ends of a diagonal line) of a section with the pen 141 through the transparent tablet 14 fixed over a map, by pressing the "initial setting enter key", and by inputting the position of the chosen destination on the transparent tablet 14 with the pen 141 and so on, the CPU 11 determines the geographic coordinates of the chosen destination, based upon the geographic coordinates of the representative points and the positional information for the representative points and for the point of destination which are input through the transparent tablet 14, and transmits the geographic coordinate data for the chosen destination to the navigation device 20.

As described above, by using the input device of the present embodiment, the positional information for a chosen destination can be easily input into the navigation device 20, by using a map and without complicated operations on the display unit 27 of the navigation device 20. In addition, the travel route search is conducted by the navigation device 20, so that an operator has no need to set the travel route himself. The operation of inputting a chosen destination is easy, so that the successive inputting of plural points of destination can be conducted quickly.

With the map data base 121 for every map on a CD-ROM card or equivalent, a plurality of maps can be used. In this case, the map should be identified by inputting the discrimination information for the map, before inputting the discrimination information for a section.

Even a map for which data is not stored in the map data base 121 can be used, so long as the map has geographic coordinates, and the inputting of a point of destination can use such a map from a commercially available magazine or guidebook.

The present invention is not limited to the above-described embodiment. For example, in step 105 of FIG. 2, when the position of a section is input through the transparent tablet 14, the geographic position of the section can be specified by inputting the positions of two predetermined corners instead of inputting the four corners of the section. When latitudinal and longitudinal accessory lines are provided on the transparent tablet 14 and the transparent tablet 14 is positioned so that the accessory lines may be parallel to the corresponding border lines of a section, the geographic position of the section can be specified by inputting the position of one predetermined corner of the section. In this case, when calculating the geographic coordinates of a chosen destination, information as to the scale of the section is also input.

When an accessory outline, of the same rectangular shape and size as a section, is provided on the transparent tablet 14, and the transparent tablet 14 is positioned so that this accessory outline is aligned with the border lines between one section and the surrounding contiguous sections, the operation of inputting the position of the section on the transparent tablet 14 is not required. In this case, the geographic coordinates of a point of destination can be obtained from the geographic coordinates of the representative points of the section and the positional information for the point of destination input through the transparent tablet 14, so that the step 105 and step 108 in FIG. 2 are not required.

As described with reference to FIG. 5 and FIG. 6, when the absolute coordinates of the representative points of a section are input, if the transparent tablet 14 is positioned so that the latitudinal and longitudinal accessory lines are parallel to the border lines between the selected section and the contiguous surrounding sections, the geographic position of the section can also be specified by inputting the position of one predetermined corner of the section. In this case, the information as to the scale of the section is also input, and when calculating the geographic coordinates of the destination, the scale information for the section is also used.

When accessory lines of a rectangular shape, i.e. the same size and shape as the selected section, are provided on the transparent tablet 14, and the transparent tablet 14 is positioned so that the accessory lines may be aligned with the border lines of the selected section, the operation of inputting the position of the section on the transparent tablet 14 is not required.

In the above-described embodiment, the operation of designating a point of destination using the input device of the invention has been described, however, the present geographic position, a stopover location and so on, other than a point of destination, may be designated. In this case, a key for identifying what is designated (other than a destination) is provided on the input device.

Using the input device of the present invention, the geographic coordinates of a designated point within a section can be obtained by mounting the transparent tablet on a map book and designating a certain point within the section, so that the positional information for a point of destination and so on can be easily input into the navigation device by using a map book.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An input device for a vehicle navigation system for use with a printed map, comprising:

map data memory means for storing discrimination information for identification of any one of plural map sections, said discrimination information including plural sets of geographic coordinates correlated with at least one representative point for each of the respective plural map sections;

discrimination information input means for inputting information identifying a selected map section from information provided on the printed map;

geographic coordinates acquisition means for obtaining, from said map data memory means, geographic coordinates of at least said one representative point of the section corresponding to the identifying information input by said discrimination information input means;

a transparent tablet for superimposing on the selected map section to output positional information for a point designated on said transparent tablet;

geographic coordinate calculating means for calculating geographic coordinates of the designated point based upon the geographic coordinates of at least said one representative point of the section, the positional relationship between said one representative point and said transparent tablet, and said positional information output from said transparent tablet; and output means for outputting the geographic coordinates calculated by said geographic coordinate calculating means to the vehicle navigation system.

2. An input device according to claim 1, wherein said geographic coordinate calculating means determines the positional relationship between the representative point and said transparent tablet from positional information for the designated point.

3. An input device according to claim 1, wherein said transparent tablet has positioning means for positioning on the selected map section to define said positional relationship between said transparent tablet and said representative point for the selected map section.

4. An input device according to claim 3, wherein said positioning means is an accessory line to be aligned with a border line on the printed map defining the selected section.

5. An input device according to claim 1, wherein said output means includes a map display means, and wherein said information identifying the selected map section includes information identifying the kind of map, page number of the map, and name of the selected section.

6. An input device according to claim 5, wherein said discrimination information input means includes a keyboard having at least ten number keys and/or letter keys for input of the discrimination information in the form of combinations of numbers and/or letters.

7. An input device according to claim 5, wherein said discrimination information input means includes a cursor-control key for inputting the discrimination information by moving a cursor on a map displayed by said map display means.

8. An input device according to claim 5, wherein said discrimination information input means includes a bar code reader for inputting the discrimination information by reading a bar code on the printed map.

9. An input device according to claim 5, wherein said discrimination information input means includes picture recognition means for inputting the discrimination information by visual recognition of the selected map section.

10. An input device according to claim 1, wherein said map data memory means contains stored, as each representative point, a pair of geographic coordinates, each defined by intersection of diagonal line through the selected section and border lines defining the selected section, said geographic points being at opposite ends of the diagonal line within the selected section.

11. An input device according to claim 1, wherein said map data memory means contains stored therein, as each representative point, at least one point of intersection of border lines defining each of the plural sections and further contains stored therein a scale for each of the plural sections.

12. An input device according to claim 1, wherein said map data memory means contains stored at least one representative point for each of plural pages of the printed map and the scale of each of the pages.

13. An input device according to claim 1, wherein said map data memory means is a CD-ROM.

14. An input device according to claim 1, wherein said map data memory means is an IC-card.

15. An input device according to claim 5, wherein said discrimination information input means is integrated with said map display means.

16. An input device according to claim 5, wherein said discrimination information input means and said map display means are separately housed.

* * * * *